United States Patent
Feder et al.

(10) Patent No.: US 7,171,089 B2
(45) Date of Patent: Jan. 30, 2007

(54) ENHANCED SUPERCONTINUUM GENERATION IN HIGHLY NONLINEAR FIBERS USING POST-FABRICATION PROCESSING

(75) Inventors: Kenneth S. Feder, Murray Hill, NJ (US); Jeffrey W. Nicholson, Chatham, NJ (US); Paul S. Westbrook, Bridgewater, NJ (US)

(73) Assignee: Fitel USA Corp., Norcross, GA (US)

( * ) Notice: Subject to any disclaimer, the term of this patent is extended or adjusted under 35 U.S.C. 154(b) by 159 days.

(21) Appl. No.: 11/063,406

(22) Filed: Feb. 22, 2005

(65) Prior Publication Data

US 2005/0226576 A1    Oct. 13, 2005

Related U.S. Application Data

(60) Provisional application No. 60/546,222, filed on Feb. 20, 2004.

(51) Int. Cl.
G02B 6/00 (2006.01)
H04J 14/02 (2006.01)
H01S 3/10 (2006.01)

(52) U.S. Cl. .................. 385/122; 385/123; 385/28; 398/81; 398/148; 372/21

(58) Field of Classification Search .............. 385/122, 385/123, 124, 28, 37, 50; 398/81, 148; 372/21; 359/237
See application file for complete search history.

(56) References Cited

U.S. PATENT DOCUMENTS

| | | | |
|---|---|---|---|
| 5,945,666 A | 8/1999 | Kersey et al. | 250/227.14 |
| 5,960,146 A | 9/1999 | Okuno et al. | 383/122 |
| 5,999,671 A | 12/1999 | Jin et al. | 385/37 |
| 6,097,870 A | 8/2000 | Ranka et al. | 385/127 |
| 6,333,803 B1 | 12/2001 | Kurotori et al. | 359/188 |
| 6,381,391 B1 | 4/2002 | Islam et al. | 385/123 |
| 6,400,865 B1 | 6/2002 | Strasser et al. | 385/28 |
| 6,480,656 B1 | 11/2002 | Islam et al. | 385/123 |
| 6,529,303 B1 | 3/2003 | Rowan et al. | 359/128 |
| 6,529,676 B2 | 3/2003 | Eggleton et al. | 385/142 |
| 6,549,702 B2 | 4/2003 | Islam et al. | 385/31 |
| 6,603,910 B2 | 8/2003 | Islam et al. | 385/123 |
| 6,628,605 B1 | 9/2003 | Chang | 370/208 |
| 6,628,877 B2 | 9/2003 | Dugan et al. | 385/129 |
| 6,658,183 B1 | 12/2003 | Chandalia et al. | 385/48 |
| 6,665,497 B1 | 12/2003 | Hamilton-Gahart et al. | 385/147 |
| 6,671,444 B1 | 12/2003 | Arai et al. | 385/126 |
| 6,753,118 B2 | 6/2004 | Deshmukh et al. | 430/30 |
| 6,760,518 B2 | 7/2004 | Girardon et al. | 385/37 |
| 6,775,447 B2 | 8/2004 | Nicholson et al. | 385/122 |
| 6,813,423 B2 * | 11/2004 | Goto et al. | 385/122 |
| 6,816,649 B2 | 11/2004 | Ronnekleiv | 385/37 |

(Continued)

*Primary Examiner*—Brian M. Healy

(57) ABSTRACT

Enhancement of the supercontinuum generation performance of a highly-nonlinear optical fiber (HNLF) is accomplished by performing at least one post-processing treatment on the HNLF. Particularly, UV exposure of the HNLF will modify its dispersion and effective area characteristics so as to increase its supercontinuum bandwidth, without resorting to techniques such as tapering or introducing unwanted reflections into the HNLF. The UV exposure can be uniform, slowly varying or aperiodic along the length of the HNLF, where the radiation will modify the nonlinear properties of the HNLF. Various other methods of altering these properties may be used. The output from the HNLF can be monitored and used to control the post-processing operation in order to achieve a set of desired features in the enhanced supercontinuum spectrum.

48 Claims, 2 Drawing Sheets

U.S. PATENT DOCUMENTS

| | | |
|---|---|---|
| 6,850,543 B2 | 2/2005 | Cundiff et al. ................. 372/18 |
| 6,915,053 B2 * | 7/2005 | Hasegawa ................... 385/124 |
| 2003/0012502 A1 | 1/2003 | Riant et al. ................... 385/37 |
| 2003/0039462 A1 | 2/2003 | Boivin et al. ................ 385/147 |
| 2003/0174985 A1 | 9/2003 | Eggleton et al. ............ 385/125 |
| 2004/0032887 A1 | 2/2004 | Ahmadvand et al. ......... 372/21 |
| 2004/0037505 A1 | 2/2004 | Morin ......................... 385/37 |
| 2004/0042500 A1 | 3/2004 | Christiansen ............... 370/509 |
| 2004/0148632 A1 | 7/2004 | Park et al. ..................... 725/81 |
| 2004/0151467 A1 | 8/2004 | Ishikawa et al. ............ 383/144 |
| 2004/0228635 A1 | 11/2004 | Price .......................... 398/149 |
| 2004/0234216 A1 * | 11/2004 | Okuno et al. ............... 385/122 |
| 2005/0002628 A1 | 1/2005 | Rahman et al. ............. 385/129 |
| 2005/0226575 A1 * | 10/2005 | Brown et al. ............... 385/122 |
| 2005/0226576 A1 * | 10/2005 | Feder et al. ................ 385/122 |

* cited by examiner

ENHANCED SUPERCONTINUUM GENERATION IN HIGHLY NONLINEAR FIBERS USING POST-FABRICATION PROCESSING

CROSS-REFERENCE TO RELATED APPLICATION

This application claims the benefit of U.S. Provisional Application No. 60/546,222, filed Feb. 20, 2004.

TECHNICAL FIELD

The present invention relates to the field of supercontinuum generation and, more particularly, to an arrangement for generating supercontinuum radiation utilizing a highly nonlinear fiber (HNLF) that has been subjected to at least one post-fabrication process to modify its physical characteristics and modify the characteristics of the resultant supercontinuum output.

BACKGROUND OF THE INVENTION

There are applications in the fiber optics field in which a high power, low noise, broadband light source is of particular interest. For example, efforts are now being made toward spectral slicing wherein a common light source is used to generate a multitude of wavelength division multiplexed (WDM) signals. Such an application thus has the potential for replacing many lasers with a single light source. Other applications include, but are not limited to, frequency metrology, device characterization, dispersion measurements made on specialty fibers, and the determination of transmission characteristics of gratings. All of these various diagnostic tools may be greatly enhanced by the availability of such a broadband source.

In general, supercontinuum generation involves the launching of relatively high laser powers, typically in the form of optical pulses, into an optical fiber, waveguide or other microstructure, where the laser pulse train undergoes significant spectral broadening due to nonlinear interactions in the fiber. Current efforts at supercontinuum generation, typically performed using light pulses having durations on the order of picoseconds ($10^{-12}$ sec) in kilometer lengths of fiber, have unfortunately shown degradation of coherence in the generating process. In particular, additional noise has been found to be introduced into the system during the spectral broadening aspect of the process.

Supercontinuum light of wavelengths spanning more than one octave have been generated in microstructured and tapered optical fibers by launching light pulses having durations on the order of femtoseconds ($10^{-15}$ sec) into the ends of such microstructured or tapered fibers. The extreme spectra thus produced are useful, for example, in measuring and stabilizing pulse-to-pulse carrier envelope phase, as well as in high-precision optical frequency combs. Efforts at modeling the continuum in microstructured fibers based on a modified nonlinear Schrodinger equation have been aimed at understanding the fundamental processes involved in the spectrum generation, and show that coherence is better maintained as the launched pulses are shortened in duration from the order of picoseconds to femtoseconds.

A relatively new type of germanium-doped silica fiber with low dispersion slope and a small effective area, referred to hereinafter as "highly nonlinear fiber", or HNLF, has recently been developed. Although the nonlinear coefficients of HNLF are still smaller than those obtained with small core microstructured fibers, the coefficients are several times greater than those of standard transmission fibers, due to the small effective area of HNLF. Supercontinuum generation using an HNLF and a femtosecond fiber laser has been reported. U.S. Pat. No. 6,775,447 issued to J. W. Nicholson et al. on Aug. 10, 2004 discloses an HNLF supercontinuum source formed from a number of separate sections of HNLF fiber that have been fused together, each having a different dispersion value at the light source wavelength and an effective area between five and fifteen square microns. The concatenation of a number of different HNLF sections allows for the dispersion of the source to be modified, but the ability to reliably and inexpensively reproduce and manufacture such a fused fiber source may be problematic. Moreover, problems remain with respect to providing spectral shaping of the supercontinuum, where such shaping is dictated, at least in part, by the ability to design and fabricate a given fiber dispersion and nonlinearity.

SUMMARY OF THE INVENTION

The need remaining in the prior art is addressed by the present invention, which relates to the field of supercontinuum generation and, more particularly, to an arrangement for generating supercontinuum radiation utilizing a highly nonlinear fiber (HNLF) that has been subjected to at least one post-fabrication process to extend its supercontinuum bandwidth without resorting to operations such as fusing, splicing and/or tapering, which are not considered to be manufacturable and reproducible in large numbers.

In accordance with the present invention, a section of HNLF is post-processed to modify its nonlinear dispersion and effective area, where these modifications have been found to extend/enhance the supercontinuum generated by an HNLF. In particular, a relatively slow ("DC") variation UV exposure is used to modify the basic waveguide properties of the HNLF, where the properties may be altered uniformly or in a slowly varied or aperiodic fashion along the length of the HNLF. A slowly-varied exposure provides nonlinear variations in dispersion and effective area as a function of the axial direction of the fiber, where this type of exposure may be controlled in real time to adjust the spectral shaping of the supercontinuum (for example, to extend or shift the bandwidth to capture a desired wavelength region, filter out unwanted noise components, and the like). For the purposes of the present invention, the variability introduced into HNLF by post-process UV exposure will generally be referred to as "supercontinuum enhancements".

It is an advantage of the present invention that the uniform/nearly uniform exposure of the HNLF allows for the nonlinear properties to be affected without introducing any features into the fiber that would generate unwanted reflections (such as found, for example, with Bragg grating structures). Therefore, the supercontinuum HNLF of the present invention can be considered as a fully transmissive device, allowing for a reflection of no more than 4% from any of the inventive post-processing techniques. Moreover, the alterations in the dispersion and effective area of the HNLF are produced without resorting to physically modifying the diameter of the fiber (e.g., tapering) to introduce the desired changes.

Various "post-processing" techniques may be used in place of the exemplary UV exposure. For example, strain and thermal treatments may alternatively be used to modify the fiber's dispersion and effective area. Similarly, treatment with a strong DC electromagnetic field (perhaps accompanied by heating or straining) will alter both the linear and nonlinear properties of the HNLF. Mechanical manipulation, as well as the inclusion of various liquids or gases within the fiber cladding region, may also be used to modify the nonlinear properties of the HNLF and enhance its supercontinuum generation abilities. Any of these various techniques may be used to provide the desired uniform/nearly uniform changes in the nonlinear properties of the HNLF, thus preventing the generation of problematic reflections.

Other and further advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Supercontinuum generation in fibers is well known and has been demonstrated in numerous fiber waveguides. Nonlinear interactions in such fibers are greatly affected by fiber properties such as effective area ($A_{eff}$) and waveguide dispersion. Waveguide dispersion governs how quickly a launched pulse will spread in the time domain and, as a result, how quickly the peak power of the pulse will decrease as it propagates along the fiber. In addition, the peak intensity of the pulse will be larger for fibers with a smaller $A_{eff}$, and will determine the magnitude of the nonlinear interactions in the waveguide itself. However, as mentioned above, current supercontinua have limitations that are dictated by the dispersion and nonlinearity of the fiber. Various applications currently exist (for example, frequency metrology) that would greatly benefit by broadening the continuum. In particular, broadening the supercontinuum would allow for a smaller length of HNLF to span an octave for a given pump power. Other limitations in the currently available supercontinuum are associated with the shape of the spectrum, the wavelength range, noise figure, etc. Generally speaking, therefore, it would be desirable to find a way to "enhance" the supercontinuum generation in fibers, where the enhancement may take the form of one or more of these desirable characteristics.

Figure 1:
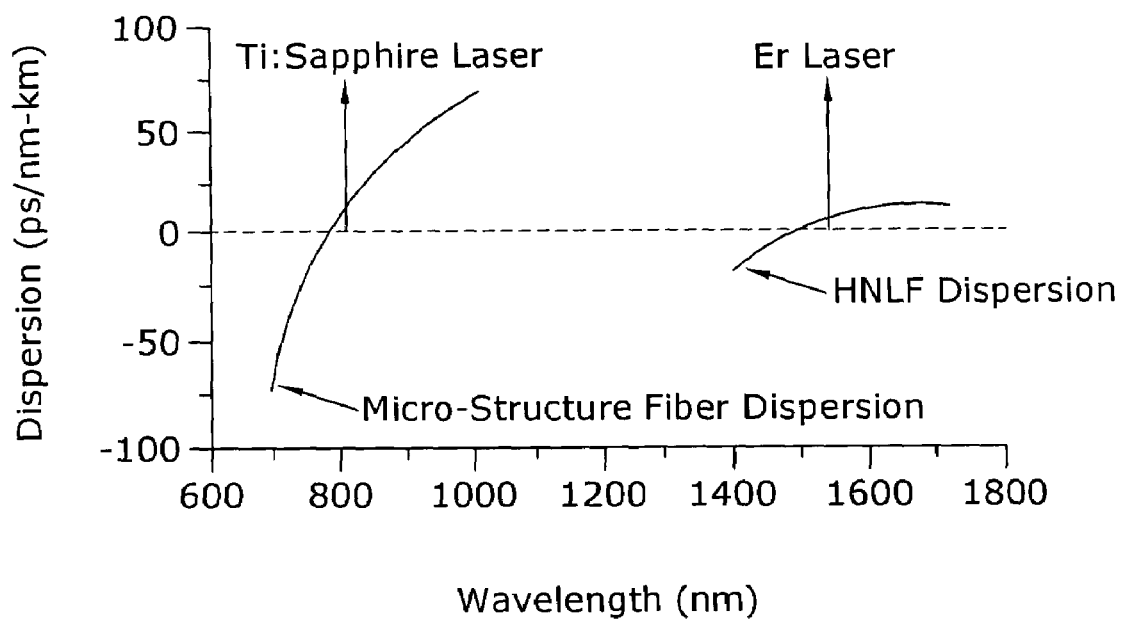
FIG. 1 contains a graph of fiber dispersion as a function of wavelength, illustrating the difference in dispersion for a microstructured fiber and a "highly-nonlinear" fiber (HNLF)

FIG. 1 contains a graph illustrating the relationship between the wavelength of a generating pulse and fiber dispersion for two different prior art supercontinuum-generating structures. The curve on the left is associated with using a Ti:sapphire laser as the pulse generating device in conjunction with an air-silica microstructured (or tapered) fiber. The curve on the right is associated with using an erbium laser source in conjunction with a section of highly-nonlinear fiber (HNLF). Numerical models show that the broadest continuum is generated when the wavelength of the laser light pulse is in the anomalous (positive) dispersion regime of the fiber. In particular, the pulse initially begins to self-Raman split to longer wavelengths; then, as higher-order solitons start to break up, parametric four-wave mixing causes frequencies to be generated at wavelengths shorter than the zero dispersion wavelength of the fiber, the combination resulting in the supercontinuum profile in the output power.

Comparing the two curves of FIG. 1, the curve associated with the HNLF is similar to that of the microstructured/tapered fiber, only shifted to longer wavelengths. Indeed, recent experiments with HNLF have shown supercontinuum generation at wavelengths of from 1.1 µm to 2.1 µm in no more than a few meters of HNLF. In accordance with the teachings of the present invention, as will be discussed in detail hereinbelow, it has been found that continuum generation in HNLF can be enhanced (for example, extended in bandwidth or improved in terms of spectral shaping) by modifying the fiber characteristics after fabrication. For example, UV exposure, electromagnetic field treatment and thermal processes may all modify the dispersion characteristics of HNLF in a manner that results in enhancing its supercontinuum output.

Supercontinuum generation in optical fibers depends on an interplay between nonlinear optical interactions and the linear dispersion of the fiber itself. Control of these dispersive properties has, to date, relied exclusively on the careful design and fabrication of an appropriate fiber waveguide, typically with very low dispersion, and a carefully-chosen zero dispersion wavelength value (in order to maintain a narrow pulse shape and provide appropriate phase matching). Applications operating in the near-infrared regions (approximately 800 nm to 1 micron) typically use a high-Δ microstructured fiber (or tapered fiber) in order to generate the desired supercontinuum (as evident from the Ti:sapphire graph of FIG. 1). The use of HNLF in supercontinuum generation has been designed, as indicated by the plot of FIG. 1, to operate in the mid-infrared region (around 1550 nm). The prior art has demonstrated that octave-spanning supercontinua can be generated in fibers only a few centimeters in length.

In accordance with the present invention, post-processing modification of an HNLF is used to further enhance and improve its continuum generation. In the past, post-processing of a fiber with actinic ultra-violet (UV) radiation has been used to alter its index of refraction. In particular, a section of HNLF responds well to UV radiation since it has a large concentration of germanium (or other appropriate dopant, such as, for example, phosphorous, boron-germanium, or antimony, among others). Exposure with typical doses of actinic UV radiation can yield a change in refractive index Δn in the fiber core of as much as 0.006. In accordance with the present invention, it has been found that the waveguide properties of dispersion and effective area, and hence the resulting supercontinuum, are both strongly altered in a UV-exposed HNLF.

The basic waveguide properties of the HNLF itself, such as dispersion and effective area, are altered using "DC" (or uniform) UV exposure along the length of the fiber. The exposure could be uniform, slowly varying or aperiodic along the length of the HNLF. By varying the exposure, the nonlinear effects will change as a function of distance along the HNLF and further modify the spectral shaping of the output supercontinuum. Other slowly varying, non-reflective structures may be formed in an HNLF (such as, for example, a tilted Bragg grating with back reflections significantly reduced by proper choice of tilt angle) to further alter the nonlinear properties of the HNLF and create more possible adjustments in its spectral shape and/or bandwidth.

Figure 2:
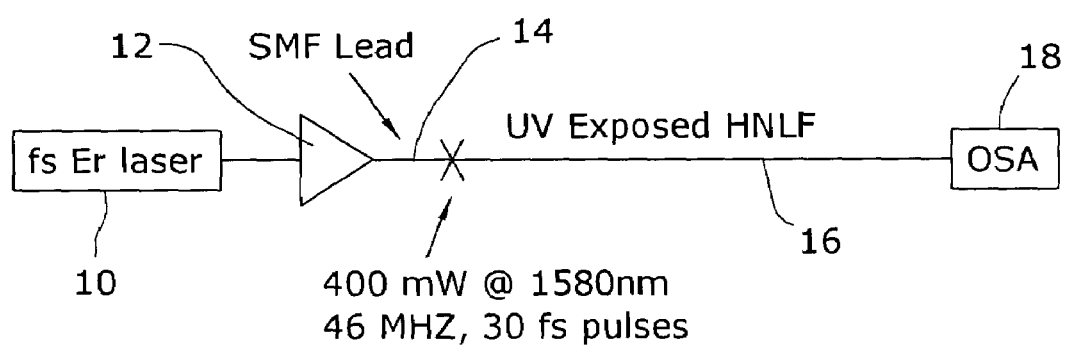
FIG. 2 illustrates an exemplary experimental arrangement that may be used to measure the supercontinuum spectra generated by HNLF segments.

FIG. 2 illustrates an exemplary experimental arrangement used to observe the differences in fiber characteristics of HNLF after UV exposure. In this example, a femtosecond erbium laser source 10 is coupled through an amplifier 12 and propagates along a section of single mode fiber 14. A UV-exposed section 16 of HNLF is spliced to single mode fiber 14, and the output is measured at an optical spectrum analyzer (OSA) 18. For one experiment, UV-exposed HNLF 16 comprised a 20 cm section of fiber that was loaded with deuterium to enhance its UV sensitivity. To create the UV exposed area, the fiber was exposed to scanned, focused UV light at 242 nm from an excimer-pumped, frequency-doubled dye laser, having a pulse duration of approximately 20 ns, with a repetition rate of 30 Hz and an average power of 25 mW. The intensity was set at approximately 246 $mJ/cm^2$ per pulse, with a total UV dosage at each point along the fiber of approximately 2.5 $kJ/cm^2$. After exposure, the fiber profile showed an index profile change $\Delta n$ of approximately 0.005.

Figure 3:
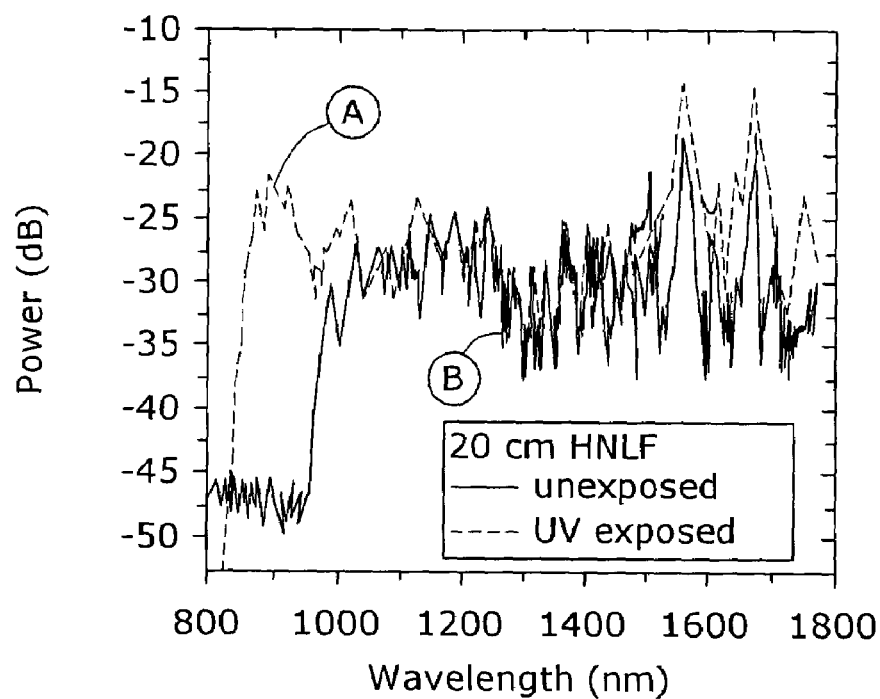
FIG. 3 is a graph illustrating the enhancement in supercontinuum spectra for an HNLF subjected to DC UV exposure (showing a comparison to a conventional HNLF section)
Figure 4:
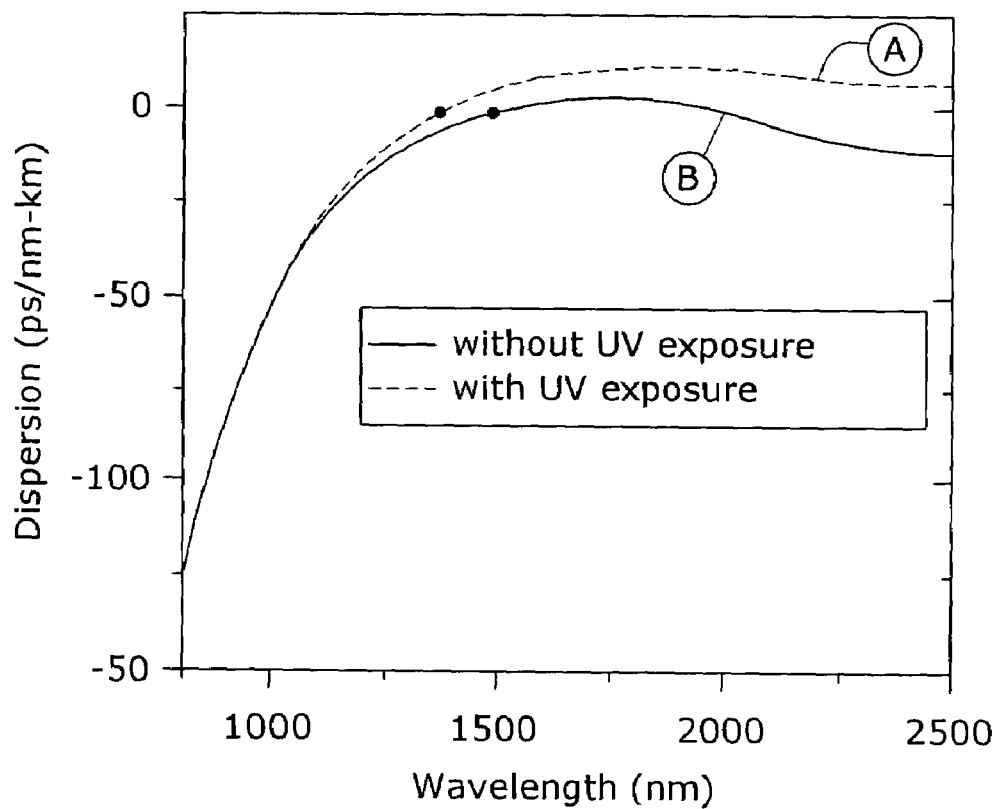
FIG. 4 is a graphical comparison of the dispersion characteristics of a prior art HNLF as compared to a post-processed, UV-exposed HNLF of the present invention.

FIG. 3 contains a graph (curve A) of the supercontinuum generated from this UV exposed fiber in the arrangement of FIG. 2, where the supercontinuum for a "non-exposed" HNLF section is also illustrated (curve B), for the sake of comparison. As is shown, the use of UV exposure results in approximately a 100 nm increase in supercontinuum bandwidth on the short wavelength side. This increase in the supercontinuum bandwidth can be accounted for by taking only the waveguide parameters into consideration. This particular experimental UV-exposed HNLF section was also found to have a dispersion zero at a location 100 nm less than that of a conventional section of HNLF. Further, the dispersion of the UV-exposed HNLF at 1550 nm (the pump wavelength) was slightly greater than that of an un-radiated fiber. These results, as shown by the dispersion plots of FIG. 4, indicate that in generating a broader continuum, the location of the dispersion zero is of greater significance than the moderate increase in dispersion at longer wavelengths. Referring to FIG. 4, curve A illustrates the dispersion characteristic of a UV-exposed HNLF, where curve B is associated with a section of conventional HNLF.

It is to be understood that the response of a particular section of HNLF to DC UV exposure—or any other post-fabrication process—will depend upon the characteristics of the pre-processed fiber, particularly in terms of its dispersion zero and effective area. Regardless, however, the benefits of DC UV exposure in improving continuum generation in HNLF are at least two-fold. First, DC exposure permits the $\Delta n$ of the fiber to be raised, allowing the possibility for supercontinuum generation in structures such as highly-doped HNLF. Further, it is expected that modifying the dispersion along the length with a slowly-varying UV exposure provides results comparable with the prior art spliced HNLF arrangement, the splicing not being particularly favored as a manufacturable technique.

The above examples have focused on utilizing UV exposure as a post-processing tool in improving the supercontinuum generation from an HNLF without resorting to splicing or tapering the fiber. While the UV exposure method may be preferred in many situations, it is to be understood that a variety of other techniques may be used in its place to form post-processing modifications in the characteristics of an HNLF supercontinuum generation source without introducing any significant changes in the fiber's diameter (as occurs when tapering). For example, post-processing strain and thermal treatments can be used to diffuse dopants and/or "freeze" a particular strain along portions of the HNLF. Thermal and strain treatments may also be used, in association with a microstructured fiber, to tailor the size of the air microstructure enough to change the fiber dispersion without appreciably changing the fiber diameter. Alternatively, treatment with strong, DC electromagnetic fields (such as poling E-fields), accompanied by heating, straining, or exposure with actinic radiation can alter the waveguide's nonlinear (as well as linear) properties. Advantageously, an electromagnetic radiation process can also generate a "tunable" nonlinearity with the HNLF, through non-uniform or periodic alteration of the fiber nonlinear (or linear) properties. Mechanical manipulation or incorporation of additional materials within the cladding of the HNLF may also play a role in expanding the bandwidth of the created supercontinuum without resorting to tapering the HNLF or creating unwanted reflections along the length of the HNLF.

It is to be noted that these various post-processing methods may be performed while monitoring the actual spectrum of light being generated by the HNLF. In this way, the spectrum may be trimmed, shifted or shaped to an optimum value, with desired noise reduction figures, through incorporating a feedback mechanism into the post-processing modification arrangement. Moreover, inasmuch as relatively short sections (on the order of centimeters) of HNLF may be sufficient to form a supercontinuum source, it is possible to utilize other waveguiding structures in place of conventional "fiber". It is clear that the essential requirements for supercontinuum generation—a waveguide with a dispersion minimum near the pump wavelength, a nonlinear refractive index, and a loss sufficiently low so as to allow a propagation distance sufficient to accumulate a large nonlinear phase shift may be present in structures other than fibers per se, such as optical waveguides, photonic bandgap structures, planar waveguides, microstructure fibers, etc.

While the foregoing description represents a preferred embodiment of the present invention, it will be obvious to those skilled in the art that various modifications may be made without departing from the spirit and scope of the invention as pointed out by the following claims.

What is claimed is:

1. An optical waveguide suitable for generation of a supercontinuum spectrum at the output thereof when light at a certain wavelength from a light source is launched into an input thereof, the waveguide comprising
    a section of highly-nonlinear waveguide that has been subjected to at least one post-fabrication process to enhance the generated supercontinuum bandwidth through the modification of at least one of the dispersion, effective area and nonlinear optical properties of the highly-nonlinear waveguide without substantially changing the dimensions of the optical waveguide, while inducing minimal reflections into any linearly propagating guided modes.

2. An optical waveguide as defined in claim 1 wherein the dimensions of the highly-nonlinear optical waveguide experience a change in diameter of no more than 1% during post processing.

3. An optical waveguide as defined in claim 1 wherein any induced reflections remain at a value of less then 4% of the linearly propagating guided modes.

4. An optical waveguide as defined in claim 1 wherein the section of highly-nonlinear waveguide comprises highly-nonlinear optical fiber (HNLF).

5. An optical waveguide as defined in claim 4 wherein the highly-nonlinear waveguide comprises a single section of highly-nonlinear optical fiber.

6. An optical waveguide as defined in claim 1 wherein the section of highly-nonlinear waveguide comprises highly-nonlinear microstructure fiber.

7. An optical waveguide as defined in claim 1 wherein the section of highly-nonlinear waveguide exhibits uniformly-modified post-fabrication process enhancements.

8. An optical waveguide as defined in claim 1 wherein the section of highly-nonlinear waveguide exhibits slowly-varying post-fabrication process enhancements.

9. An optical waveguide as defined in claim 1 wherein the section of highly-nonlinear waveguide exhibits periodically-modified post-fabrication process enhancements.

10. An optical waveguide as defined in claim 1 wherein the section of highly-nonlinear waveguide exhibits aperiodically-modified post-fabrication process enhancements.

11. An optical waveguide as defined in claim 1 wherein the section of highly-nonlinear waveguide is exposed to ultra-violet radiation as the post-fabrication process, so as to modify at least one of its dispersion, effective area and nonlinear optical properties, thereby enhancing the supercontinuum bandwidth.

12. An optical waveguide as defined in claim 11 wherein the highly-nonlinear waveguide is modified in the ultra-violet radiation post-fabrication process to extend its supercontinuum bandwidth.

13. An optical waveguide as defined in claim 11 wherein the highly-nonlinear waveguide is modified in the ultra-violet radiation post-fabrication process to provide spectral shaping to its generated supercontinuum radiation.

14. An optical waveguide as defined in claim 11 wherein the highly-nonlinear waveguide is modified in the ultra-violet radiation post-fabrication process to shift its supercontinuum bandwidth to exhibit a different center wavelength.

15. An optical waveguide as defined in claim 11 wherein the highly-nonlinear waveguiding material is modified in the ultra-violet radiation post-fabrication process to reduce the noise signal present in the generated supercontinuum radiation.

16. An optical waveguide as defined in claim 1 wherein the section of highly-nonlinear waveguide is subjected to strain-induced changes in at least one of its dispersion, effective area and nonlinear optical properties as the post-fabrication process.

17. An optical waveguide as defined in claim 1 wherein the section of highly-nonlinear waveguide is subjected to electromagnetic-induced modifications in the nonlinear and linear characteristics during the post-fabrication process.

18. A source of optical supercontinuum radiation, the source comprising
a source of light having a certain wavelength and a known output power as a function of time; and
at least one section of highly-nonlinear waveguide coupled to the source of light, wherein the at least one section of highly-nonlinear waveguide has been subjected to at least one post-fabrication process to enhance the generated supercontinuum bandwidth through the modification of at least one of the dispersion, effective area and nonlinear optical properties of the at least one section of highly-nonlinear waveguide without substantially changing the dimensions of the at least one section of highly-nonlinear waveguide, while inducing minimal reflections into any linearly propagating guided modes, the light from the source propagating through the at least one section of highly-nonlinear waveguide so as to generate as an output enhanced supercontinuum optical radiation.

19. The source of optical supercontinuum radiation as defined in claim 18 wherein the at least one section of highly-nonlinear waveguide comprises at least one section of highly-nonlinear optical fiber, subjected to at least one post-fabrication process so as to enhance its generated supercontinuum spectrum.

20. The source of optical supercontinuum radiation as defined in claim 18 wherein the dimensions of the at least one section of highly-nonlinear waveguide experience a change in diameter of no more than 1% during post processing.

21. The source of optical supercontinuum generation as defined in claim 18 wherein any induced reflections in the at least one section of highly-nonlinear waveguide remain at a value of less then 4% of the linearly propagating guided modes.

22. The source of optical supercontinuum generation as defined in claim 18 wherein the at least one section of highly-nonlinear waveguide comprises at least one section of highly-nonlinear optical fiber (HNLF).

23. The source of optical supercontinuum generation as defined in claim 22 wherein the at least one section of highly-nonlinear waveguide comprises a single section of highly-nonlinear optical fiber.

24. The source of optical supercontinuum generation as defined in claim 18 wherein the at least one section of highly-nonlinear waveguide comprises at least one section of highly-nonlinear microstructure fiber.

25. The source of optical supercontinuum generation as defined in claim 18 wherein the at least one section of highly-nonlinear waveguide exhibits uniformly-modified post-fabrication process enhancements.

26. The source of optical supercontinuum generation as defined in claim 18 wherein the at least one section of highly-nonlinear waveguide exhibits slowly-varying post-fabrication process enhancements.

27. The source of optical supercontinuum generation as defined in claim 18 wherein the at least one section of highly-nonlinear waveguide exhibits periodically-modified post-fabrication process enhancements.

28. The source of optical supercontinuum generation as defined in claim 18 wherein the at least one section of highly-nonlinear waveguide exhibits aperiodically-modified post-fabrication process enhancements.

29. The source of optical supercontinuum generation as defined in claim 18 wherein the at least one section of highly-nonlinear waveguide is exposed to ultra-violet radiation as the post-fabrication process, so as to modify at least one of its dispersion, effective area and nonlinear optical properties, thereby enhancing the supercontinuum bandwidth.

30. The source of optical supercontinuum generation as defined in claim 18 wherein the at least one section of highly-nonlinear waveguide is modified in the post-fabrication process to extend its supercontinuum bandwidth.

31. The source of optical supercontinuum generation as defined in claim 18 wherein the at least one section of highly-nonlinear waveguide is modified in the post-fabrication process to provide spectral shaping to its generated supercontinuum radiation.

32. The source of optical supercontinuum generation as defined in claim 18 wherein the at least one section of highly-nonlinear waveguide is modified in the post-fabrication process to shift its supercontinuum bandwidth to exhibit a different center wavelength.

33. The source of optical supercontinuum generation as defined in claim 18 wherein the at least one section of highly-nonlinear waveguide is modified in the post-fabrication process to reduce the noise signal present in the generated supercontinuum radiation.

34. The source of optical supercontinuum generation as defined in claim 18 wherein the at least one section of highly-nonlinear waveguide is subjected to strain-induced changes in at least one of its dispersion, effective area and nonlinear optical properties as the post-fabrication process.

35. The source of optical supercontinuum generation as defined in claim 18 wherein the at least one section of highly-nonlinear waveguide is subjected to electromagnetic-induced modifications in the nonlinear and linear characteristics during the post-fabrication process.

36. A source of optical supercontinuum radiation, the source comprising
 a source of light having a certain wavelength and a known output power as a function of time; and
 at least one section of highly-nonlinear waveguide that has been subjected to at least one post-fabrication process to enhance the generated supercontinuum bandwidth through the modification of the optical properties of the at least one section of highly-nonlinear waveguide without substantially changing the dimensions of the at least one section of highly-nonlinear waveguide, while inducing minimal reflections into any linearly propagating guided modes.

37. A method of enhancing the supercontinuum generation of a highly nonlinear optical waveguide, the method comprising the steps of:
 a) providing at least one section of highly-nonlinear optical waveguide;
 b) subjecting the at least one section of highly-nonlinear waveguide to a process that alters the dispersion, effective area and/or nonlinear properties of the at least one section of highly-nonlinear waveguide without substantially changing the dimensions of the at least one section of highly-nonlinear waveguide, while inducing minimal reflections in the linearly propagating guided modes.

38. The method as defined in claim 37 wherein in performing step b), ultra-violet radiation is employed to alter the dispersion, effective area and/or nonlinear optical properties of the at least one section of highly-nonlinear waveguide.

39. The method as defined in claim 37 wherein an essentially uniform exposure is used to modify the dispersion and effective area characteristics.

40. The method as defined in claim 37 wherein in performing step b), ultra-violet radiation is used to slowly vary the nonlinear properties of the at least one section of highly nonlinear waveguide along the length thereof.

41. The method as defined in claim 37 wherein in performing step b), ultra-violet radiation is used to periodically vary the nonlinear properties of the at least one section of highly nonlinear waveguide along the length thereof.

42. The method as defined in claim 37 wherein in performing step b), ultra-violet radiation is used to aperiodically vary the nonlinear properties of the at least one section of highly nonlinear waveguide along the length thereof.

43. The method as defined in claim 37 wherein in performing step b), ultra-violet radiation is used to periodically modify the dispersion, effective area and/or nonlinear optical characteristics of the at least one section of highly-nonlinear waveguide, while reflecting less than 4% of a propagating signal into a linearly propagating guided mode.

44. The method as defined in claim 37 wherein in performing step b), a thermal or mechanical strain-inducing method is used to alter the dispersion, effective area and nonlinear optical properties of the at least one section of highly-nonlinear waveguide.

45. The method as defined in claim 37 wherein in performing step a), at least one section of microstructured fiber is provided and in performing step b), a process is used to change the hole size of the at least one section of microstructured fiber along the length thereof.

46. The method as defined in claim 37 wherein in performing step b), a DC electromagnetic field is used to alter the nonlinear and linear properties of the at least one section of highly-nonlinear waveguide.

47. The method as defined in claim 37, wherein the method further comprises the step of:
 c) measuring the changes in the characteristics of the generated supercontinuum spectrum as a function of the alterations in the dispersion, effective area and nonlinear properties of the at least one section of highly-nonlinear waveguide.

48. The method as defined in claim 47, wherein the method further comprises the step of:
 d) using the measurements from step c) in a feedback loop to control the processes used in step b) to alter the dispersion, effective area and/or nonlinear properties of the at least one section of highly-nonlinear waveguide in order to optimize the introduced enhancements.

* * * * *